US012427473B2

(12) United States Patent
Junk et al.

(10) Patent No.: US 12,427,473 B2
(45) Date of Patent: Sep. 30, 2025

(54) SEPARATION ARTICLES AND METHODS FOR USING THE SAME FOR SELECTIVELY REMOVING DIFLUOROMETHANE FROM A GASESOUS MIXTURE

(71) Applicants: Chromis Fiberoptics, Inc., Warren, NJ (US); University of Kansas, Lawrence, KS (US)

(72) Inventors: Christopher P. Junk, Wilmington, DE (US); Whitney Ryan White, Watchung, NJ (US); Mark Brandon Shiflett, Lawrence, KS (US); Abby Noelle Harders, Lawrence, KS (US)

(73) Assignees: Chromis Fiberoptics, Inc., Warren, NJ (US); University of Kansas, Lawrence, KS (US)

( * ) Notice: Subject to any disclaimer, the term of this patent is extended or adjusted under 35 U.S.C. 154(b) by 319 days.

(21) Appl. No.: 18/147,766

(22) Filed: Dec. 29, 2022

(65) Prior Publication Data
US 2023/0211282 A1 Jul. 6, 2023

Related U.S. Application Data

(60) Provisional application No. 63/295,108, filed on Dec. 30, 2021.

(51) Int. Cl.
*B01D 53/22* (2006.01)
(52) U.S. Cl.
CPC .... *B01D 53/228* (2013.01); *B01D 2257/7025* (2013.01); *B01D 2325/022* (2013.01);
(Continued)
(58) Field of Classification Search
CPC .......... B01D 53/228; B01D 2325/0281; B01D 2257/7025; B01D 2325/022; B01D 2325/32; B01D 2325/34
See application file for complete search history.

(56) References Cited

U.S. PATENT DOCUMENTS 5,276,121 A * 1/1994 Resnick ................... G02B 1/04
526/254
2011/0082223 A1* 4/2011 Hood ....................... C08J 9/125
521/79
(Continued)

FOREIGN PATENT DOCUMENTS

WO   2021/076480 A1   4/2021

OTHER PUBLICATIONS

Pardo etal. "Toward the Recycling of Low-GWP Hydrofluorocarbon/Hydrofluoroolefin Refrigerant Mixtures Using Composite IonicLiquid-Polymer Membranes" ACS Sustainable Chem Eng 2021, 9 7012-7021 (Year: 2021).*

(Continued)

*Primary Examiner* — Anthony R Shumate
(74) *Attorney, Agent, or Firm* — Thomas | Horstemeyer, LLP

(57) ABSTRACT

Described herein are separation articles such as, for example, films, membranes and the like separating at least one component from a gaseous mixture comprising two or more components comprising difluoromethane (HFC-32, $CH_2F_2$) and pentafluoroethane (HFC-125, $C_2F_5H$). The disclosed articles include a "selective layer" that is selectively permeable for the desired component to be separated from the gas mixture. The selective layer is composed of an amorphous fluorinated copolymer. Optionally, the article may include other layers which serve various purposes such as, for example, a porous support layer, a "gutter layer," which allows the permeate gas to pass from the selective layer to the porous layer with minimal flow impedance, and a protective layer, which protects the selective layer from fouling. Each component of the separation articles described herein and methods for making and using the same are provided below.

22 Claims, 6 Drawing Sheets

(52) U.S. Cl.
CPC .. *B01D 2325/0281* (2022.08); *B01D 2325/32* (2013.01); *B01D 2325/34* (2013.01)

(56) References Cited

U.S. PATENT DOCUMENTS

| | | | | |
|---|---|---|---|---|
| 2011/0091688 | A1* | 4/2011 | Maurer | B29C 44/5627 428/159 |
| 2011/0313072 | A1* | 12/2011 | Maurer | B29C 44/352 521/146 |
| 2012/0101174 | A1* | 4/2012 | Mittag | B29C 44/352 264/41 |
| 2012/0112117 | A1* | 5/2012 | Vo | C08J 9/36 252/62 |
| 2012/0114895 | A1* | 5/2012 | Vo | E04B 1/803 428/69 |
| 2012/0118481 | A1* | 5/2012 | Gordon-Duffy | B29C 44/06 156/78 |
| 2012/0149793 | A1* | 6/2012 | Stobby | C08J 9/125 521/76 |
| 2013/0053466 | A1* | 2/2013 | Hood | C08J 9/0061 521/147 |
| 2020/0199886 | A1* | 6/2020 | Van Giel | B32B 23/20 |
| 2020/0208415 | A1* | 7/2020 | Feys | E04C 2/20 |
| 2021/0316255 | A1 | 10/2021 | Junk et al. | |
| 2022/0186138 | A1* | 6/2022 | Matsumoto | C09K 5/045 |
| 2022/0364007 | A1* | 11/2022 | Matsumoto | C10M 107/34 |

OTHER PUBLICATIONS

International Search Report and Written Opinion for International Application No. PCT/US2022/082504 mailed Jun. 14, 2023.
Pardo, F.; Zarca, G.; Urtiaga, A. Effect of Feed Pressure and Long-Term Separation Performance of Pebax-Ionic Liquid Membranes for the Recovery of Difluoromethane (R32) from Refrigerant Mixture R410A. Journal of Membrane Science2021, 618, 118744. https://doi.org/10.1016/j.memsci.2020.118744.
Harders et al., 377f—Permeability, Solubility, and Diffusivity of HFC-32 and HFC-125 in Polymeric Membranes, Nov. 9, 2021 [retrieved on May 1, 2021]. Retrieved from the internet: <URL: https://aiche.confex.com/aiche/2021/meetingapp.cgi/Paper/623174>. entire document.
El-Okazy et al., Gas separation performance of copolymers of perfluoro(butenyl vinyl ether) and perfluoro(2,2-dimethyl-1,3-dioxole), Journal of Membrane Science, vol. 634, May 12, 2021 [retrieved on Mar. 1, 2023]. Retrieved from the internet: <URL: https://www.sciencedirect.com/science/article/pii/S0376738821003495>. pp. 1-8.

* cited by examiner

SEPARATION ARTICLES AND METHODS FOR USING THE SAME FOR SELECTIVELY REMOVING DIFLUOROMETHANE FROM A GASESOUS MIXTURE

CROSS REFERENCE TO RELATED APPLICATIONS

This application claims the benefit of U.S. Provisional Application No. 63/295,108 filed on Dec. 30, 2021, which is incorporated herein by reference in its entirety.

STATEMENT REGARDING FEDERALLY SPONSORED RESEARCH OR DEVELOPMENT

This invention was made with government support under 2029354 awarded by the National Science Foundation. The government has certain rights in the invention.

BACKGROUND

Hydrofluorocarbons (HFCs) are a class of compounds widely used in refrigeration and air conditioning systems. These refrigerants were created to replace chlorofluorocarbon (CFC) and hydrochlorofluorocarbon (HCFC) refrigerants that are linked to the depletion of the Earth's ozone layer. The Kyoto Protocol—an international treaty that extends the 1992 United Nations Framework Convention on Climate Change—postulates targets for the reduction of greenhouse gases including HFCs.[1] Moreover, EU Regulation no. 517/2014 implements the reduction of up to two-thirds of the 2010 fluorinated greenhouse gas emissions by 2030.[2] Most recently, the 2020 United States stimulus package passed in the wake of the COVID-19 pandemic includes provisions to reduce the production and importation of HFC refrigerants by 85% by 2035 and implements the international platform of the Kigali Amendment to prevent warming of up to 0.5° C.[3] With international and national initiatives in place for restricting the use of high GWP HFCs, energy-efficient separation methods are needed in order to effectively dispose and recycle azeotropic refrigerant mixtures that will be phased out over the next two decades.

R-410A, a near azeotropic refrigerant mixture composed of 50 mass % HFC-32 ($CH_2F_2$) and 50 mass % HFC-125 ($CHF_2CF_3$), was developed to replace HCFC-22 and is used in a large number of commercial and residential air-conditioning applications.[4] R-410A was developed to replaced HCFC-22 (chlorodifluoromethane, $CHClF_2$) which was banned for use in new equipment in 2010. With substantial amounts of HFCs circulating globally—1000 ktons of HFCs are estimated to be in global circulation—the question of how industries should handle the surplus of unused R-410A and HFC refrigerants is a timely issue complicated by the lack of industrially feasible separation methods for azeotropic mixtures.[5] Without the ability to separate R-410A into its constituent refrigerants, excess stocks of the refrigerant would likely be incinerated or vented into the atmosphere. Venting unused refrigerants is illegal, but without strict oversight is occurring. High-temperature incineration is the only disposal method available and is expensive as well as energy intensive. Thus, the need for a sustainable process for the separation of HFC-32 from R-410A is a timely issue made critical by existing and pending regulations on refrigerant mixtures.

Fluorinated refrigerant gases are typically separated by distillation, which depends on differences in the boiling point and vapor pressure of the components as the primary separation mechanism. In some cases, however, there are important separation problems wherein the components are azeotropic, or near-azeotropic, so that distillation-based separation methods are impractical. For example, the widely used refrigerant R-410A consists of an azeotropic mixture of two components: HFC-32, which has relatively low global warming potential, and HFC-125, which has relatively high global warming potential. In such a case, it is desirable to separate the lower-GWP component for reuse, while separating the higher-GWP component for incineration or other forms of disposal.

Membrane-based gas separation methods operate on the principle of differential permeability of gases through the selective layer of a membrane, which is often composed of polymers. The membrane material in such a separation process is chosen to provide a very high permeability for one or more of the gases, while providing a much lower permeability for the other gases. The mixed gas stream is then introduced on one side of the membrane, and the high permeability gases pass preferentially through the membrane, resulting in a "permeate" gas stream on the other side of the membrane. This permeate stream will be enriched in the high-permeability gases compared with the input gas stream. Meanwhile as the input stream proceeds across the input-side surface of the membrane to the exit of the membrane module, it will become enriched in low-permeability species compared with the input gas stream. This stream is referred to as the "retentate" stream [see for example, Baker, Membrane Technology and Applications, Wiley, West Sussex, 2012].

Because this membrane-based separation requires only a pressure differential across the membrane to operate, it can be accomplished with relatively simple and reliable equipment, typically consisting primarily of a compressor and a membrane module. For the same reason, it typically uses far less power than the above methods of gas separation. Moreover, membrane-based methods of gas separation avoid the use of toxic and corrosive materials such as alkyl amines often used in chemical absorption methods, and they typically offer a considerably lower capital cost as well.

Also, since membrane-based separation methods separate components on the basis of their differential permeability in a polymer membrane, their separation characteristics are typically quite different from the separation characteristics of a distillation process. Thus, azeotropic mixtures in which the component gases have substantially different membrane permeabilities may be separable by a membrane method, when they are inseparable by a distillation method. Accordingly, membranes-based separation methods are potentially promising separation methods for certain azeotropic and near-azeotropic mixtures of refrigerants or other gases.

SUMMARY

Described herein are articles and methods for separating gases, particularly mixtures of difluoromethane (HFC-32, $CH_2F_2$) and pentafluoroethane (HFC-125, $C_2F_5H$). The article includes a selective layer including an amorphous fluorinated copolymer. In one aspect, the selective layer exhibits relatively high permeability for difluoromethane while exhibiting low permeability for pentafluoroethane, resulting in a membrane with a high selectivity. Methods for making and using the articles described herein are also provided.

Other methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
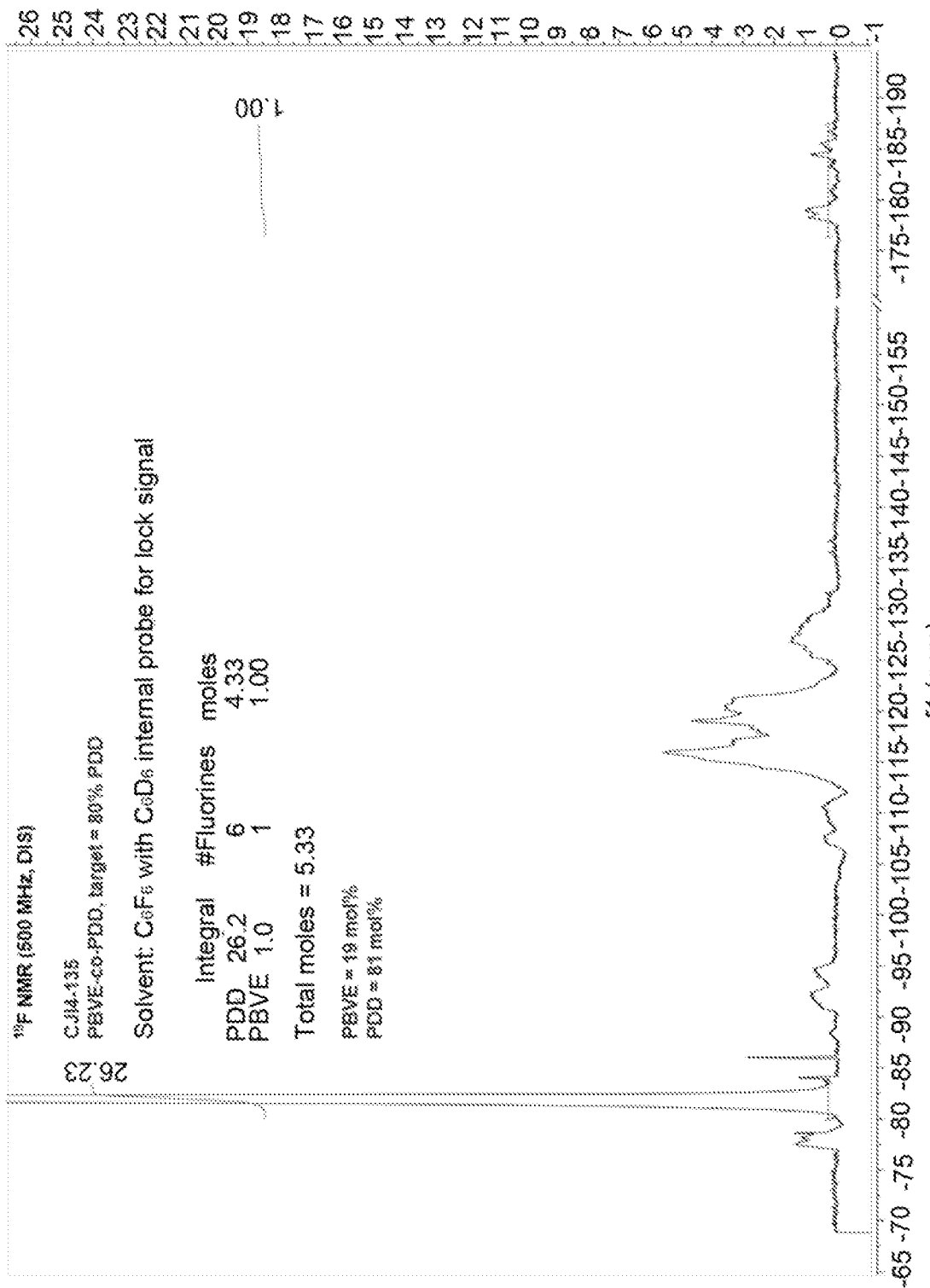
FIG. 1 shows the $^{19}$F NMR of an exemplary PDD-co-PBVE copolymer used herein.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, the term "comprising" is intended to include examples and aspects encompassed by the terms "consisting essentially of" and "consisting of." Similarly, the term "consisting essentially of" is intended to include examples encompassed by the term "consisting of.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not.

As used in the specification and the appended claims, the singular forms "a," "an" and "the" include plural referents unless the context clearly dictates otherwise. Thus, for example, reference to "a fluorinated ring monomer," "a comonomer," or "a copolymer," include, but are not limited to, mixtures or combinations of two or more such fluorinated ring monomers, comonomers, or copolymers, and the like.

The term "gas" as used herein means a gas or a vapor.

The term "polymer" as used herein generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic and atactic symmetries.

The term "ideal selectivity" is the ratio of the HFC-32 permeability divided by the HFC-125 permeability ($\alpha_{HFC-32/HFC-125}$). An exemplary method for determining the permeability of HFC-32 and HFC-125 is provided in Example 2 herein.

The term "diffusivity ratio" is the ratio of the HFC-32 solubility divided by the HFC-125 solubility ($D_{HFC-32}/D_{HFC-125}$). An exemplary method for determining the solubility of HFC-32 and HFC-125 is provided in Example 8 herein.

The term "highly fluorinated" as used herein means that at least 50% of the available hydrogen bonded to carbon have been replaced by fluorine.

The terms "fully-fluorinated" and "perfluorinated" as used herein are interchangeable and refer to a compound where all the available hydrogens bonded to carbon have been replaced by fluorine.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms. The term alkyl group can also be a C1 alkyl, C1-C2 alkyl, C1-C3 alkyl, C1-C4 alkyl, C1-C5 alkyl, C1-C6 alkyl, C1-C7 alkyl, C1-C8 alkyl, C1-C9 alkyl, C1-C10 alkyl, and the like up to and including a C1-C24 alkyl.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halide, e.g., fluorine, chlorine, bromine, or iodine. Alternatively, the term "monohaloalkyl" specifically refers to an alkyl group that is substituted with a single halide, e.g. fluorine, chlorine, bromine, or iodine. The term "polyhaloalkyl" specifically refers to an alkyl group that is independently substituted with two or more halides, i.e. each halide substituent need not be the same halide as another halide substituent, nor do the multiple instances of a halide substituent need to be on the same carbon. The term "alkoxyalkyl" specifically refers to an alkyl group that is substituted with one or more alkoxy groups, as described below. The term "aminoalkyl" specifically refers to an alkyl group that is substituted with one or more amino groups. The term "hydroxyalkyl" specifically refers to an alkyl group that is substituted with one or more hydroxy groups. When "alkyl" is used in one instance and a specific term such as "hydroxyalkyl" is used in another, it is not meant to imply that the term "alkyl" does not also refer to specific terms such as "hydroxyalkyl" and the like.

The term "alkenyl" or "olefinic" as used herein is a fluorocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene or olefin is present, or it can be explicitly indicated by the bond symbol C=C. In one aspect, an "alkenyl" or "olefinic" compound can include two carbon-carbon double bonds (e.g., is a diene).

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

All percentages herein are by volume unless otherwise stated. Unless otherwise specified, temperatures referred to herein are based on atmospheric pressure (i.e. one atmosphere).

Described herein are separation articles such as, for example, films, membranes and the like separating at least one component from a gaseous mixture comprising two or more components comprising difluoromethane (HFC-32, $CH_2F_2$) and pentafluoroethane (HFC-125, $C_2F_5H$). The disclosed articles include a "selective layer" that is selectively permeable for the desired component to be separated from the gas mixture. The selective layer is composed of an amorphous fluorinated copolymer. Optionally, the article may include other layers which serve various purposes such as, for example, a porous support layer, a "gutter layer," which allows the permeate gas to pass from the selective layer to the porous layer with minimal flow impedance, and a protective layer, which protects the selective layer from fouling. Each component of the separation articles described herein and methods for making and using the same are provided below.

Amorphous Fluorinated Copolymers

The separation articles described herein include one or more amorphous fluorinated copolymers. In one aspect, the amorphous fluorinated copolymer is produced by copolymerizing two or more fluorinated non-dioxolane ring monomers. Described below are the components and methods for making the copolymers.

Fluorinated Non-Dioxolane Ring Monomers

In one aspect, the fluorinated non-dioxolane ring monomer can have an olefinic structure, where the monomer possesses one or more carbon-carbon double bonds. In another aspect, the fluorinated non-dioxolane ring monomer can be a conjugated or non-conjugated diene. In one aspect, representative fluorinated ring monomers include, but are not limited to, to one or more olefinic compounds shown in Scheme 1 below as well as combinations thereof.

In another aspect, the fluorinated ring monomer can include one or more acyclic monomers that, upon polymerization, produce a fluorinated ring. For example, the third structure depicted in Scheme 1 can cyclize upon polymerization to produce a five-membered ring.

Scheme 1: fluorinated non-dioxolane ring monomers

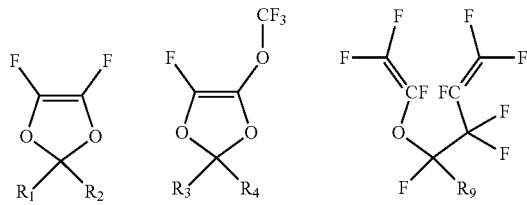

$R_1$ and $R_2$ are independently F, $CF_3$, $CF_2CF_3$, $CF_2H$, $CF_2CF_2H$, $CFHCF_3$, $CFHCF_2H$;

$R_3$ and $R_4$ are independently F, $CF_3$, or $CF_2CF_3$, $CF_2H$, $CF_2CF_2H$, $CFHCF_3$, $CFHCF_2H$; and $R_9$ is F, $CF_3$, or $CF_2CF_3$.

In one aspect, the fluorinated non-dioxolane ring monomer has the structure below, where $R^1$ and $R^2$ are $CF_3$. In another aspect, $R^1$ is F and $R^2$ is $CF_3$.

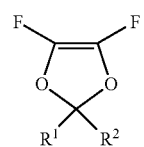

In another aspect, the fluorinated non-dioxolane ring monomer is

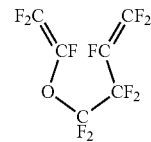

In one aspect, the amorphous fluorinated copolymer is produced by copolymerizing two or more fluorinated non-dioxolane ring monomers. In another aspect, the amorphous fluorinated copolymers are produced from at least two different fluorinated non-dioxolane monomers comprising perfluoro(butenyl vinyl ether) [PBVE] perfluoro(2,2-dimethyl-1,3-dioxole) and perfluoro(2,2-dimethyl-1,3-dioxole) [PDD].

Scheme 2: fluorinated non-dioxolane monomers

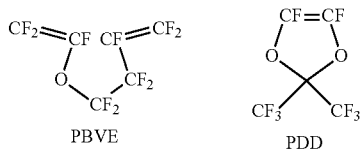

PBVE    PDD

In one aspect, disclosed herein is an amorphous copolymer produced by copolymerizing two or more monomers, comprising PBVE and PDD, wherein (a) the PBVE monomer undergoes a ring-closing polymerization to form 5-member and 6-member rings, (b) the PDD and PBVE monomers are both incorporated randomly in the copolymer, with the PBVE comonomer in the amount of from about 20 mol % to about 90 mol %. In one aspect, the amount of PBVE used to produce the copolymers described herein is 20, 25, 30, 35, 40, 45, 50, 55, 60, 65, 70, 75, 80, 85, or 90 mol %, where any value can be a lower and upper endpoint of a ranges (e.g. 40 mol % to 60 mol %, 45 mol % to 55 mol %, etc.).

In one aspect, the amount of PDD used to produce the copolymers described herein is about 20 mol % to about 90 mol %, or about 20, 25, 30, 35, 40, 45, 50, 55, 60, 65, 70, 75, 80, 85, or 90 mol %, where any value can be a lower and upper endpoint of a ranges (e.g. 40 mol % to 60 mol %, 45 mol % to 55 mol %, etc.). In another aspect, the amorphous fluorinated copolymer consists only of perfluoro(butenyl vinyl ether) [PBVE] and perfluoro(2,2-dimethyl-1,3-dioxole) [PDD]. The structure of the resulting copolymer is shown in Scheme 3.

Scheme 3: PBVE-PDD copolymer

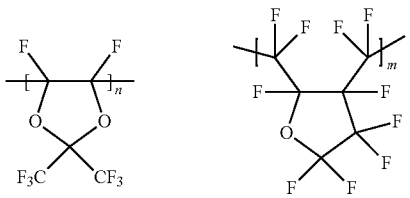

In one aspect, the amorphous fluorinated copolymers described herein can be made by solution or aqueous emulsion polymerization. In another aspect, if the solution method is used, suitable solvents can be poly- or perfluorinated compounds such as perfluorooctane, Vertrel® XF ($CF_3CFHCFHCF_2CF_3$), or Fluorinert® FC-43 (perfluorotri-n-butyl amine). In an alternative aspect, if the aqueous emulsion method is used, a suitable surfactant will be used. In one aspect, the disclosed polymers can optionally be polymerized in the absence of any solvent. In a further aspect, initiators can be chosen from those typically used for fluoropolymers such as hydrocarbon peroxides, fluorocarbon peroxides, hydrocarbon peroxydicarbonates, and inorganic types such as persulfates.

In one aspect, depending on the relative reactivity of the monomers to be used in the polymerization, they can either be added as a single precharge, or they may need to be co-fed as a ratioed mixture to produce the desired copolymer composition.

In another aspect, when the polymerization is determined to be complete, the polymer can be isolated using methods known in the art. In one aspect, for the solution method, the solvent (and any unreacted monomer(s)) can be removed by distillation at atmospheric or lower pressure. In some aspects, due to the typically high viscosity and amorphous nature of the polymers of this disclosure, further rigorous drying is often required to get rid of residual solvent. In a further aspect, this can involve heating to between 200 to 300° C. at atmospheric or lower pressure for between 2 to 48 hours. In another aspect, tor the aqueous emulsion method, the emulsion can be broken by several methods including freeze/thaw, addition of a strong mineral acid such as nitric acid, high shear mixing, or a combination of these methods.

The Examples provide non-limiting procedures for producing the copolymers described herein.

In one aspect, the composition of the amorphous fluorinated copolymers used herein can usually be determined by $^{19}F$ NMR spectroscopy. Further in this aspect, the polymers are readily soluble in perfluorobenzene and an insert probe of deuterobenzene ($C_6D_6$) can be used to give a lock signal. In a further aspect, differential scanning calorimetry (DSC) can be used to determine the glass transition temperature ($T_g$), and the molecular weight distribution can be found by using gel permeation chromatography (GPC) with a styrene-divinyl benzene column in a perfluorinated solvent coupled with a multi-detector analysis module including refractive index, low-angle light scattering, and right-angle light scattering detectors or using other suitable equipment and/or methods as known in the art. If desired, in one aspect, the type and concentration of end groups can also be determined by pressing a film of the polymer and acquiring an infrared (IR) spectrum in transmission mode.

In one aspect, the amorphous fluorinated copolymer can have a glass transition temperature of from about 150° C. to about 260° C., or about 150° C., 175° C., 200° C., 225° C., 250° C., or 260° C., or a combination of any of the foregoing values, or a range encompassing any of the foregoing values.

In still another aspect, the amorphous fluorinated copolymer can have a number average molecular weight ($M_n$) of from about 10 kDa to about 2,000 kDa, or 10 kDa, 50 kDa, 100 kDa, 150 kDa, 200 kDa, 250 kDa, 300 kDa, 350 kDa, 400 kDa, 450 kDa, 500 kDa, 550 kDa, 600 kDa, 650 kDa, 700 kDa, 750 kDa, 800 kDa, 850 kDa, 900 kDa, 950 kDa, 1,000 kDa, 1,050 kDa, 1,100 kDa, 1,150 kDa, 1,200 kDa, 1,250 kDa, 1,300 kDa, 1,350 kDa, 1,400 kDa, 1,450 kDa, 1,500 kDa, 1550 kDa, 1,600 kDa, 1,650 kDa, 1,700 kDa, 1,750 kDa, 1,800 kDa, 1,850 kDa, 1,900 kDa, 1,950 kDa, or 2,000 kDa, or a combination of any of the foregoing values, or a range encompassing any of the foregoing values.

In still another aspect, the amorphous fluorinated copolymer can have a weight average molecular weight ($M_w$) of from about 10,000 g/mol to about 3,000,000 g/mol, or 10,000 g/mol, 50,000 g/mol, 100,000 g/mol, 200,000 g/mol, 300,000 g/mol, 400,000 g/mol, 500,000 g/mol, 600,000 g/mol, 700,000 g/mol, 800,000 g/mol, 900,000 g/mol, 1,000,000 g/mol, 1,100,000 g/mol, 1,200,000 g/mol, 1,300,000 g/mol, 1,400,000 g/mol, 1,500,000 g/mol, 1,600,000 g/mol, 1,700,000 g/mol, 1,800,000 g/mol, 1,900,000 g/mol, 2,000,000 g/mol, 2,100,000 g/mol, 2,200,000 g/mol, 2,300,000 g/mol, 2,400,000 g/mol, 2,500,000 g/mol, 2,600,000 g/mol, 2,700,000 g/mol, 2,800,000 g/mol, 2,900,000 g/mol, or 3,000,000 g/mol, or a combination of any of the foregoing values, or a range encompassing any of the foregoing values.

In another aspect, the amorphous fluorinated copolymer has a PBVE content between 40 mol % and 60 mol % and a PDD content between 40 mol % and 60 mol %, a weight average molecular weight ($M_w$) of from about 250,000 g/mol to about 350,000 g/mol, and a number average molecular weight ($M_n$) of from about 150,000 g/mol to about 350,000 g/mol.

Separation Articles and Applications Thereof

Disclosed herein are separation articles including or made from the amorphous fluorinated copolymers described herein. In one aspect, the article can be a multi-layered structured article, wherein at least one layer of the structure includes or is made from the copolymers described herein. In another aspect, the article can be a film, a membrane, a tube, or a fiber.

In still another aspect, the article can include a layer or coating of the amorphous fluorinated copolymer. In one aspect, the layer or coating has a thickness of less than or equal to 1 µm, or less than or equal to about 950, 900, 850, 800, 750, 700, 650, 600, 550, or about 500 nm, or a combination of any of the foregoing values, or a range encompassing any of the foregoing values. In another aspect, the layer or coating has a thickness of about 50 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, or 1 µm, or a combination of any of the foregoing values, or a range encompassing any of the foregoing values.

In a further aspect, the amorphous fluorinated copolymer may be formed or shaped into any shape that is necessary or desirable for use as a separation article. There are numerous methods known to shape the copolymer chosen for the selective layer into single-layer or multilayer films or membranes. In some aspects, the selective layer can comprise an unsupported film, tube, or fiber of the amorphous fluorinated copolymer as a single-layer membrane. In some aspects, an unsupported film may be too thick to permit desirable gas flow through the membrane. Therefore, in some aspects, the membrane may comprise a very thin selective layer composed of the amorphous fluorinated copolymer placed on top of (i.e., adjacent to or in contact with) a much more permeable supporting structure. For example, in one aspect, the membrane may comprise an integral asymmetric membrane, in which a denser selective layer is placed on top of a microporous support layer. Such membranes were originally developed by Loeb and Sourirajan, and their preparation in flat sheet or hollow fiber form is described, for example, in U.S. Pat. No. 3,133,132 to Loeb, and U.S. Pat. No. 4,230,463 to Henis and Tripodi, the disclosures of which are incorporated herein by reference.

In some aspects, the membrane may comprise multiple layers, including at least one selective layer, with each layer serving a distinct purpose. Further in this aspect, in such multilayer composite membranes, there may be a microporous support layer, which provides mechanical strength. In another aspect, the multilayer membrane may include a non-porous, but highly permeable "gutter" layer, for example, coated (i.e., adjacent to) on the microporous support layer. Further in this aspect, this gutter layer is generally not selective, but may instead form a smooth surface on which to deposit the extremely thin selective layer, which performs the primary selective function of the membrane. In another aspect, the gutter layer also may channel permeate gas to the pores of the support layer. In an additional aspect, the selective layer may be covered by a protective layer. In one aspect, the primary purpose of the protective layer is to prevent fouling of the selective layer, such as by certain components of the gas stream. In some aspects, the disclosed multilayer structures may be, but not necessarily, formed by solution casting. General preparation techniques for making composite membranes of this type are described, for example, in U.S. Pat. No. 4,243,701 to Riley et al, the disclosures of which are incorporated herein by reference. In one aspect, disclosed herein is a gas separation membrane including a feed side and a permeate side, wherein the separation membrane has a selective layer that includes or is constructed from a copolymer described herein.

In one aspect, the multilayer composite membrane may take flat-sheet, tube, or hollow-fiber form. In hollow-fiber form, in one aspect, multilayer composite membranes may be made by the amorphous fluorinated copolymers described herein by a coating procedure as taught, for example, in U.S. Pat. Nos. 4,863,761; 5,242,636; and 5,156,888, or by using a double-capillary spinneret of the type taught in U.S. Pat. Nos. 5,141,642 and 5,318,417, the disclosures of which are incorporated herein by reference. In one aspect, a plurality of hollow fibers can be housed in a separation unit In another aspect, the thickness of the membrane's selective layer may be determined based on one or more parameters of the separation process. In one aspect, the thickness of the membrane's selective layer is less than about 1 µm. In another aspect, the selective layer can be even thinner, for example, the selective layer can be as thin as 0.5 µm or less. The selective layer, in one aspect, should have a thickness that is sufficiently thin so that the membrane can provide a pressure-normalized flux, as measured with pure hydrogen gas at 25° C., of at least 100 GPU (where 1 GPU=1×10$^{-6}$ cm$^3$(STP)/cm$^2$s cm Hg), and preferably at least 400 GPU.

In one aspect, the separation articles described herein are mechanically robust and also exhibit high thermal stability, and high chemical resistance. In another aspect, the amorphous fluorinated copolymers described herein that form the selective layer are typically soluble only in perfluorinated solvents. In still another aspect, they are also typically stable over many years when immersed in acids, alkalis, oils, low-molecular-weight esters, ethers and ketones, aliphatic and aromatic hydrocarbons, and oxidizing agents. In yet another aspect, they are also thermally stable over many years at temperatures below the glass transition temperature.

In one aspect, the separation articles described herein may be used in any suitable apparatus. For example, membranes are typically used in the form of a module, comprising the membrane prepared in any known form, and housed in any convenient type of housing and separation unit. Any number of membrane modules may be used in conjunction (e.g., in serial, in parallel) to treat a gas stream. The number of membrane modules may be determined based on one or more factors including, for example, the necessary or desired flow volume, stream composition, and other operating parameters of the separation process. In the separation process, in one aspect, the membrane is exposed to a flowing gaseous feed-composition comprising the gas mixture. In another aspect, this gas flow is created by a pressure differential that is established across the membrane, either through pressurization of the feed/retentate side of the membrane, or application of vacuum to the permeate side of the membrane. Separation of the components of the gas stream occurs, in one aspect, through the membrane, producing a gas stream on the permeate-side of the membrane with a composition enriched in the more permeable component of the gas mixture. Conversely, in another aspect, the gas stream exiting the module on the feed/retentate side of the membrane has a composition that is depleted in the more permeable component of the gas mixture, and thus enriched in the less permeable component (or components) of the gas mixture.

In one aspect, the disclosure relates to an apparatus and a process for separating at least one component from a gas mixture. In another aspect, the disclosed apparatus includes a separation article as described herein (e.g., membrane) that includes a "selective layer" that is configured to be selectively permeable for the desired component to be separated from the gas mixture. Optionally, in an aspect, the membrane may contain one or more other layers which serve various purposes, such as a porous support layer, a "gutter layer" which allows the permeate gas to pass from the selective layer to the porous layer with minimal flow impedance, and a protective layer, which protects the selective layer from fouling.

The separation articles described herein are useful in the field of gas separation. In one aspect, disclosed herein is a method for separating a first gaseous component from a gaseous mixture, the process comprising passing the gaseous mixture across a separation article described herein. In one aspect, the separation article is a membrane having a selective layer composed of an amorphous fluorinated copolymer described herein. In some aspects, the amorphous fluorinated copolymer can be cast from solution onto a membrane to produce a selective layer. In one aspect, amorphous fluorinated copolymer is soluble in one or more solvents. Conversely, crystalline fluoropolymers, which typically have negligible solubility in solvents, are not preferred. In another aspect, crystalline polymers typically exhibit low gas permeabilities as compared to amorphous polymers.

In one aspect, the separation articles described herein are effective in removing difluoromethane (HFC-32, $CH_2F_2$) from a gaseous mixture, wherein the gaseous mixture includes HFC-32 and one or more additional fluorinated gases. In one aspect, the separation articles described herein are effective in removing difluoromethane (HFC-32, $CH_3F$) while not removing pentafluoroethane (HFC-125, $C_2F_5H$).

Not wishing to be bound by theory, the amorphous fluorinated copolymer present in the separation articles described herein are highly permeable to HFC-32 while not permeable to other fluorinated gases such as, for example, HFC-125. In one aspect, the amorphous fluorinated copolymer has an ideal selectivity of HFC-32 to HFC-125 from about 5 to about 50, or 5, 10, 15, 20, 25, 30, 35, 40, 45, or 50, where any value can be a lower and upper endpoint of a range (e.g., 20 to 35). In another aspect, the amorphous fluorinated copolymer has a diffusivity ratio of HFC-32 to HFC-125 of from about 10 to about 200, or 10, 20, 30, 40, 50, 60, 70, 80, 90, 100, 110, 120, 130, 140, 150, 160, 170, 180, 190, or 200, where any value can be a lower and upper endpoint of a range (e.g., 50 to 100).

In one aspect, a process for separating a first component from a gaseous mixture includes introducing a feed stream comprising the gaseous mixture to the disclosed membrane. Further in these aspects, the membrane has a first side, a second side, and a selective layer that is selectively permeable for the first component, i.e., the first component has a higher permeability through the selective layer than other components of the gaseous mixture. In one aspect, the feed stream is introduced to the first side of the membrane. Further in this aspect, a driving force (e.g., pressure differential) causes at least a portion of the gaseous mixture to permeate through the membrane from the first side to the second side, providing a permeate stream on the second side of the membrane. In a further aspect, the resulting permeate stream is enriched in the first component. In another aspect, a residue or retentate stream depleted in the first component may be withdrawn from the first side of the membrane.

In one aspect, in the gas separation method disclosed herein, the method includes at least the following steps:
(a) passing the gaseous mixture across a separation article having a feed side and a permeate side, the separation article having a selective layer that is selectively permeable to at least the first gaseous component, said selective layer comprising the amorphous fluorinated copolymer; and
(b) providing a driving force sufficient for transmembrane permeation of at least a portion of the gaseous mixture from the feed side to the permeate side of the separation membrane, resulting in a gaseous permeate stream on the permeate side of the separation membrane and a gaseous retentate stream on the feed side of the separation membrane, wherein the gaseous permeate stream includes the first gaseous component.

In another aspect, the permeate stream has a concentration of first component that is greater than a concentration of the first component in the retentate stream.

In still another aspect, the method further includes the step of withdrawing the permeate stream from the permeate side of the separation article. In a further aspect, the method also includes the step of withdrawing the retentate stream from the feed side of the separation membrane.

In one aspect, the gaseous mixture includes one or more fluorinated refrigerant gases. In another aspect, the gas mixture includes an azeotropic or near-azeotropic mixture of gases. In another aspect, the gas mixture includes an azeotropic or near-azeotropic mixture of gases, of which one or more of the components is a fluorinated refrigerant. In another aspect, the gas mixture comprises difluoromethane (HFC-32, $CH_2F_2$) and pentafluoroethane (HFC-125, $C_2F_5H$). In one aspect, the articles and methods described herein are effective in removing HFC-32 from a mixture comprising HFC-32 and HFC-125. In one aspect, greater than about 50, 55, 60, 65, 70, 76, 80, 86, 90, or more than about 95% of HFC-32 in the gaseous mixture permeates through the selective layer of the separation article and removed from the gaseous mixture.

Aspects

Aspect 1. A separation article comprising a first surface and a second surface, and a selective layer adjacent to at least one of the first surface or the second surface, wherein said selective layer comprises an amorphous fluorinated copolymer for selectively removing difluoromethane (HFC-32, $CH_2F_2$) from a gaseous mixture.

Aspect 2. The separation article of Aspect 1, wherein the amorphous fluorinated copolymer is produced by copolymerizing two or more fluorinated non-dioxolane ring monomers.

Aspect 3. The separation article of Aspect 2, wherein the fluorinated non-dioxolane ring monomer comprises two or more of the following compounds:

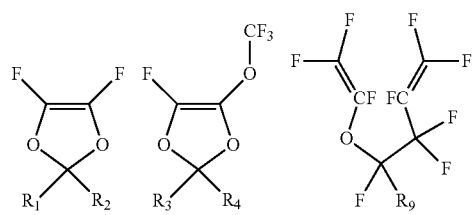

wherein
$R_1$ and $R_2$ are independently F, $CF_3$, $CF_2CF_3$, $CF_2H$, $CF_2CF_2H$, $CFHCF_3$, $CFHCF_2H$;

R$_3$ and R$_4$ are independently F, CF$_3$, or CF$_2$CF$_3$, CF$_2$H, CF$_2$CF$_2$H, CFHCF$_3$, CFHCF$_2$H; and R$_9$ is F, CF$_3$, or CF$_2$CF$_3$.

Aspect 4. The separation article of Aspect 1, wherein the amorphous fluorinated copolymer comprises a copolymer of perfluoro(butenyl vinyl ether) [PBVE] and perfluoro(2,2-dimethyl-1,3-dioxole) [PDD].

Aspect 5. The separation article of Aspect 4, wherein the amorphous fluorinated copolymer has a PBVE content between about 20 mol % and about 90 mol % and a PDD content between about 20 mol % and about 90 mol %.

Aspect 6. The separation article of Aspect 4, wherein the amorphous fluorinated copolymer has a PBVE content between about 40 mol % and about 60 mol % and a PDD content between about 40 mol % and about 60 mol %.

Aspect 7. The separation article of Aspect 1, wherein the selective layer is an amorphous fluorinated copolymer consisting of perfluoro(butenyl vinyl ether) [PBVE] and perfluoro(2,2-dimethyl-1,3-dioxole) [PDD].

Aspect 8. The separation article in any one of Aspects 1-7, wherein the amorphous fluorinated copolymer has a glass transition temperature of from about 150° C. to about 260° C.

Aspect 9. The separation article in any one of Aspects 1-8, wherein the amorphous fluorinated copolymer has a number average molecular weight (M$_n$) of from about 10 kDa to about 2,000 kDa.

Aspect 10. The separation article in any one of Aspects 1-9, wherein the amorphous fluorinated copolymer has a weight average molecular weight (M$_w$) of from about 10,000 g/mol to about 3,000,000 g/mol.

Aspect 11. The separation article in any one of Aspects 1-10, wherein the gaseous mixture comprises difluoromethane (HFC-32) and pentafluoroethane (HFC-125).

Aspect 12. The separation article in any one of Aspects 1-11, wherein the amorphous fluorinated copolymer has an ideal selectivity of HFC-32 to HFC-125 from about 5 to about 50.

Aspect 13. The separation article in any one of Aspects 1-11, wherein the amorphous fluorinated copolymer has a diffusivity ratio of HFC-32 to HFC-125 of from about 10 to about 200.

Aspect 14. The separation article in any one of Aspects 1-13, wherein the article comprises a film, a membrane, a tube, or a fiber.

Aspect 15. The separation article of Aspect 14, wherein the article comprises a coating of the amorphous fluorinated copolymer.

Aspect 16. The separation article in any one of Aspects 1-13, wherein the article comprises an asymmetric membrane comprising the amorphous fluorinated copolymer adjacent to a microporous support layer.

Aspect 17. The separation article in any one of Aspects 1-13, wherein the article comprises an asymmetric membrane comprising the amorphous fluorinated copolymer adjacent to a gutter layer, and the gutter layer is adjacent to a microporous support layer.

Aspect 18. The separation article in any one of Aspects 1-13, wherein the article comprises a membrane unit having a plurality of hollow fiber membranes, the membrane unit having a feed side and a permeate side, wherein the hollow fibers comprise the amorphous fluorinated copolymer.

Aspect 19. A method for separating a first gaseous component from a gaseous mixture comprising two or more fluorinated gases, said process comprising passing the gaseous mixture across a separation article in any of one of Aspects 1-18, wherein the gaseous mixture comes into contact with the selective layer.

Aspect 20. The method of Aspect 19, wherein the method comprises
(a) passing the gaseous mixture across a separation article having a feed side and a permeate side, the separation article having a selective layer that is selectively permeable to at least the first gaseous component, said selective layer comprising the amorphous fluorinated copolymer;
(b) providing a driving force sufficient to provide for permeation of at least a portion of the gaseous mixture from the feed side to the permeate side of the separation article, resulting in a gaseous permeate stream on the permeate side of the separation article and a gaseous retentate stream on the feed side of the separation article, wherein the gaseous permeate stream comprises the first gaseous component.

Aspect 21. The method of Aspect 19 or 20, wherein the gaseous mixture comprises difluoromethane (HFC-32, CH$_2$F$_2$) and pentafluoroethane (HFC-125, C$_2$F$_5$H).

Aspect 22. The method of Aspect 21, wherein the method selectively removes difluoromethane (HFC-32, CH$_2$F$_2$) from the gaseous mixture.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric conditions.

Example 1

Synthesis of PDD-co-PBVE Copolymer

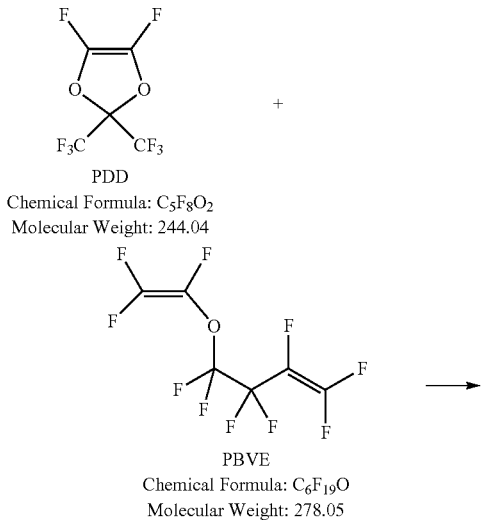

PDD
Chemical Formula: C$_5$F$_8$O$_2$
Molecular Weight: 244.04

PBVE
Chemical Formula: C$_6$F$_{19}$O
Molecular Weight: 278.05

-continued

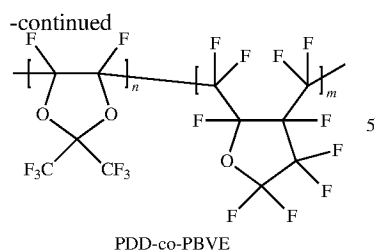

PDD-co-PBVE

Perfluorooctane solvent (480 mL, 854 g) was added to a 1000 mL Duran glass jar along with a magnetic stir bar. The lid was attached and valves to an argon source and vacuum (30 Torr) were connected. The solvent was degassed by cycling four times through vacuum/argon backfill. Freshly distilled PDD (35.0 mL, 56.0 g) was added via syringe, followed by the PBVE comonomer (35.0 mL, 44.7 g). The polymerization was initiated by addition of hexafluoropropylene oxide dimer peroxide (HFPO-DP, [$CF_3CF_2CF_2OCF(CF_3)COO]_2$) solution (3.0 mL of 0.16 M in Vertrel XF). The solution was stirred at 22° C. for 20 hours at which time it had completely gelled. The gel was dried in a vacuum oven (275° C., 200 milliTorr) for 15 hours to obtain 55 g of white copolymer. Composition was determined by $^{19}F$ NMR (FIG. 1) to be 81/19 mol % PDD/PBVE. Tg measured by DSC=182° C. GPC in perfluorooctane gave Mn=220,000 g/mol and Mw=297,000 g/mol. Copolymers with different PDD and PBVE content were synthesized by varying the amount of PDD and PBVE.

Example 2

Single Gas Permeability of HFC-32 and HFC-125 in 50% PBVE/50% PDD

Figure 2:
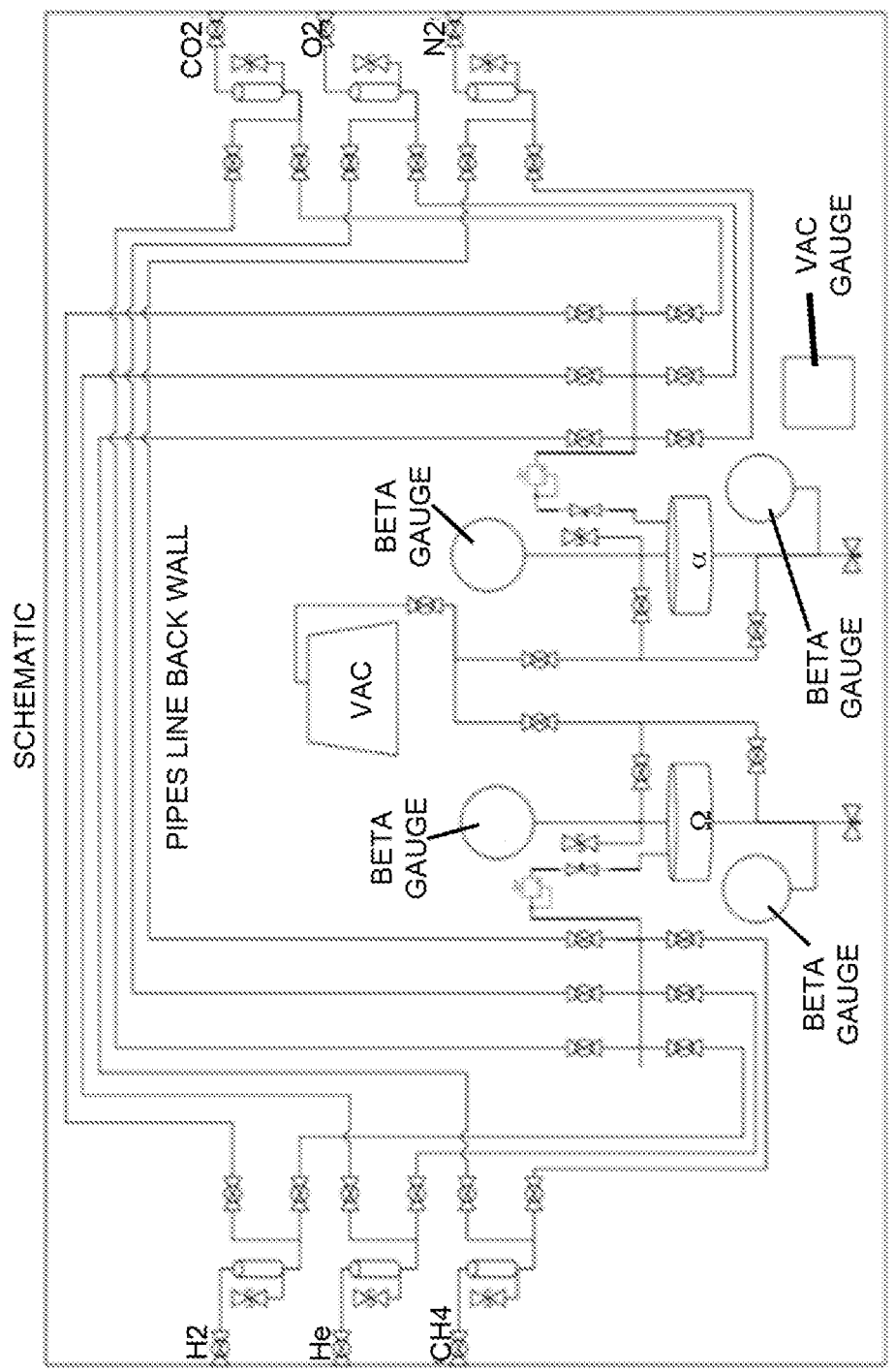
FIG. 2 shows a static membrane apparatus for measuring the permeability of HFC-32 and HFC-125 by amorphous fluorinated copolymers described herein.

The permeability of HFC-32 and HFC-125 was measured using a static membrane apparatus and the pressure rise method. A schematic of the permeability apparatus is shown in FIG. 2. The apparatus is installed inside a chemical fume hood equipped with molecular sieve dryers (W.A. Hammond Drierite Company Ltd., L68NP303) for the removal of $H_2O$. A vacuum/turbo pump (Pfeiffer HiCube 80 Eco, HiPace 80 Turbo Pump with TC 110, DN 63 ISO-K) is stationed in the fume hood for degassing the apparatus and samples at low vacuum ($10^{-4}$ torr) before permeability measurements. A temperature control system allows for the heating and temperature measurement of the sample from 293.15-373.15 K (Cal Controls 3300 Series Temperature Controller).

The static membrane apparatus measures the permeability of a gas through a polymeric film adhered to a brass disk. The brass disk has a hole of known area (1.28 $cm^2$) in which a polymeric film of known thickness is adhered to using a quick-setting epoxy glue. The thickness of the polymeric film is measured with a digital micrometer (Starrett Digital IP67 Outside Micrometer, No. 796.1). When the apparatus is assembled, the brass disk with the adhered film sits on a sintered metal support disk. Underneath the sintered metal disk is the downstream side of the apparatus, which has a known volume that is used in the permeability equation. The volume of the downstream-side was measured by intruding the downstream-side with a liquid of known mass and density in order to obtain the volume. The permeability of a species through the polymeric film is calculated using Eq. 1:

$$P = \frac{-V_{DS}\delta}{ARTt} \cdot \ln\left(\frac{P_{US} - P_{DS}}{P_{US}}\right) \quad (1)$$

Figure 3:
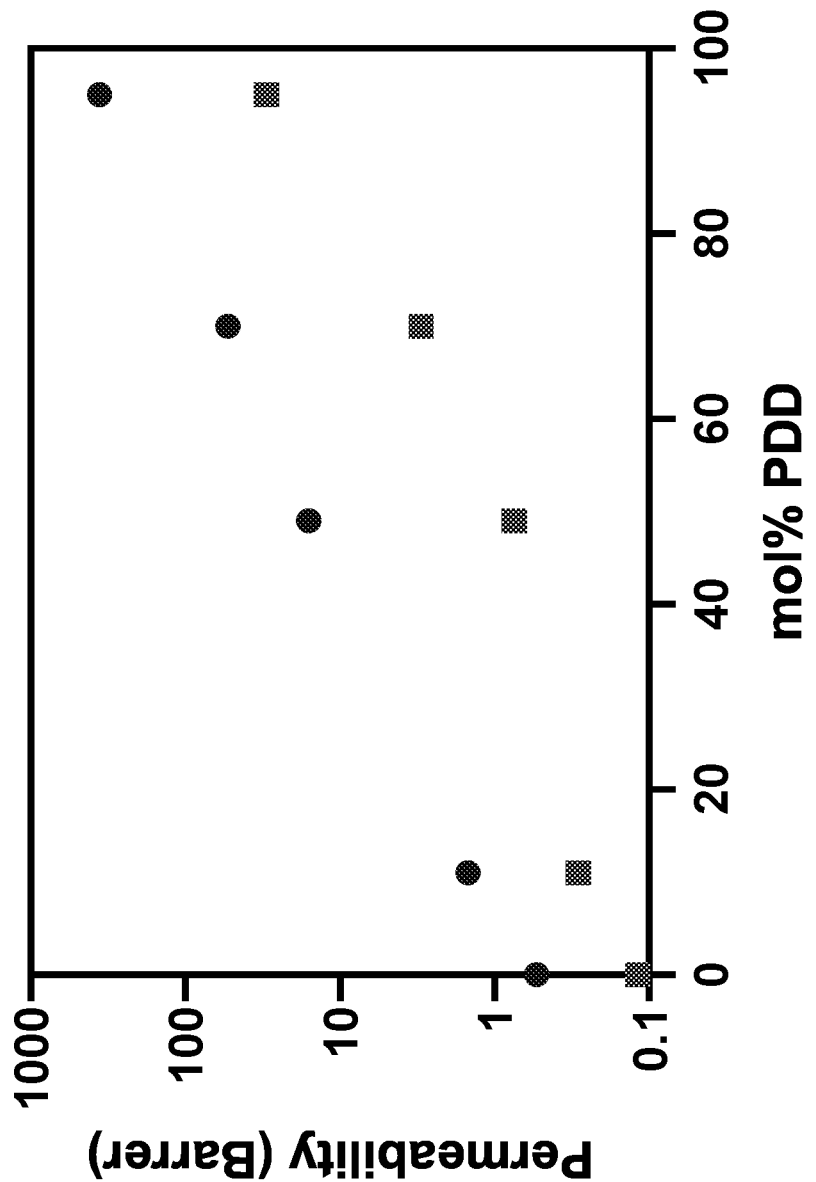
FIG. 3 shows the permeability of HFC-32 (○) and HFC-125 (□) in PBVE-co-PDD polymers at 35° C. and 2 bar.

The fluoropolymer was first treated with an etching solution (FluoroEtch® Safety Solvent) in order to increase the adhesion with the brass disk. Single gas permeation data was collected for both HFC-32 and HFC-125 at 35° C. and 2 bar as shown in FIG. 3. The permeation tests were run until a steady-state permeation was reached. The permeability results for HFC-32 and HFC-125 in the 50% PBVE/50% PDD copolymer film are recorded in Table 1, showing a high selectivity of 28±7.

TABLE 1

Permeability of HFC-32 and HFC-125 in 50% PBVE/50% PDD at 35° C. and 2 bar

| Permeate | Permeability (Barrer) | Selectivity ($\alpha_{HFC-32/HFC-125}$) |
|---|---|---|
| HFC-32 | 21 ± 0.1 | 28 ± 7 |
| HFC-125 | 0.75 ± 0.2 | |

Example 3

Single Gas Permeability of HFC-32 and HFC-125 in Varying Compositions of PBVE-co-PDD The pure-gas permeability of HFC-32 and HFC-125 was measured in 5 different compositions (89/11%, 50/50%, 30/70%, 5/95%, 100/0%) of PBVE-co-PDD membrane as shown in FIG. 3, The ratio of the HFC-32 to HFC-125 permeance (i.e., ideal selectivity) reaches a maximum at the 50% PDD composition and decreases at lower and higher PDD compositions.

Example 4

Temperature Influence on the Single Gas Permeability of HFC-32 and HFC-125 in 50% PDD/50% PBVE The single gas permeability of HFC-32 and HFC-125 in 50% PDD/50% PBVE was measured at 50° C. The same procedure as in Example 2 was followed for the measurement of the single gas permeability at the various temperatures. The apparatus was vacuumed to $10^{-4}$ torr at the measurement temperature for a minimum of 12 hours before running any subsequent permeability measurements with a given film. The temperature dependence of the permeability is shown in Table 2, indicating no significant change in the selectivity with an increase in temperature.

TABLE 2

Permeability of HFC-32 and HFC-125 at 50° C. and 2 bar

| Permeate | Permeability (Barrer) | Selectivity ($\alpha_{HFC-32/HFC-125}$) |
|---|---|---|
| HFC-32 | 45 | >20 |
| HFC-125 | <2 | |

Example 5

Single Gas Permeability of HFC-32 and HFC-125 in Varying Compositions of PBVE-co-PDD The permeability results for HFC-32 and HFC-125 in polymeric films composed of 100% PBVE, 89% PBVE—11% PDD, 50% PBVE—50% PDD, 30% PBVE—70% PDD, and 5% PBVE—95% PDD were measured and shown in FIG. 3 and Table 3.

Figure 4:
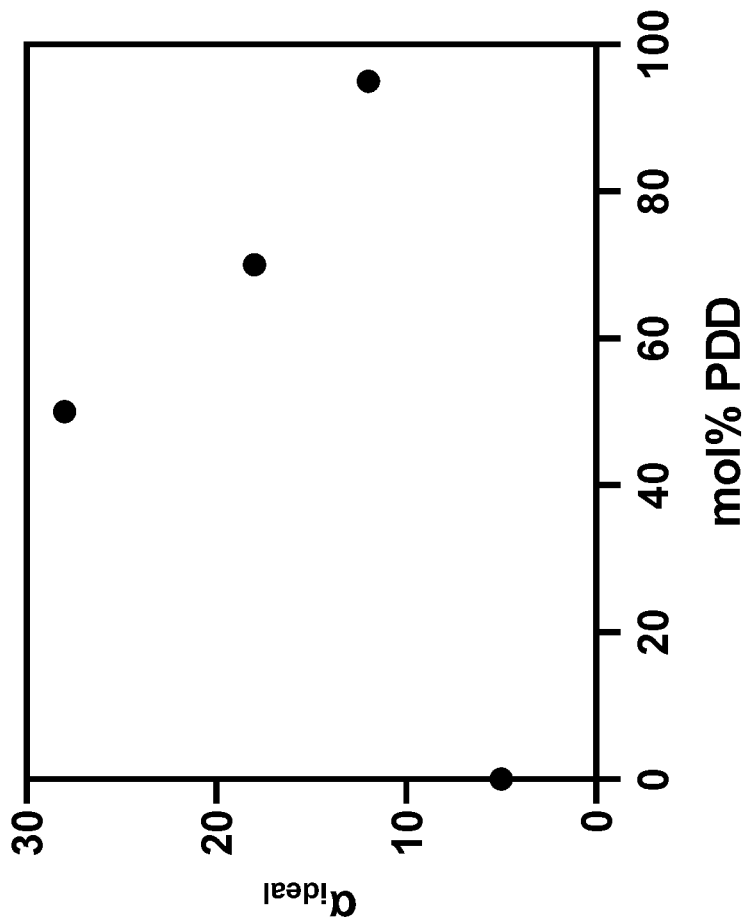
FIG. 4 shows the Ideal Selectivity in PBVE-co-PDD polymers at 35° C. and 2 bar.

The ideal selectivity is the ratio of the HFC-32 permeability divided by the HFC-125 permeability. The maximum ideal selectivity of about $\alpha_{HFC-32/HFC-125}=28$ occurs at a 50% PBVE—50% PDD copolymer composition as shown in FIG. 4 and Table 3.

TABLE 3

Permeability of HFC-32 and HFC-125 at 35° C. and 2 bar in PBVE-co-PDD polymers

| Copolymers | P: HFC-32 (Barrer) | P: HFC-125 (Barrer) | $\alpha_{HFC-32/HFC-125}$ |
|---|---|---|---|
| PBVE | 0.54 ± 0.09 | 0.12 ± 0.1 | 5 ± 1 |
| 89% PBVE-11% PDD | 1.5 ± 0.1 | 0.29 ± 0.1 | 5 ± 2 |
| 50% PBVE-50% PDD | 21 ± 0.1 | 0.75 ± 0.2 | 28 ± 7 |
| 30% PBVE-70% PDD | 53.3 ± 0.1 | 3.0 ± 0.2 | 18 ± 1 |
| 5% PBVE-95% PDD | 361 ± 2 | 30.0 ± 0.8 | 12 ± 0.3 |

Example 6

Mixed Gas Selectivity of HFC-32 and HFC-125 in PBVE-co-PDD Polymers

Figure 5:
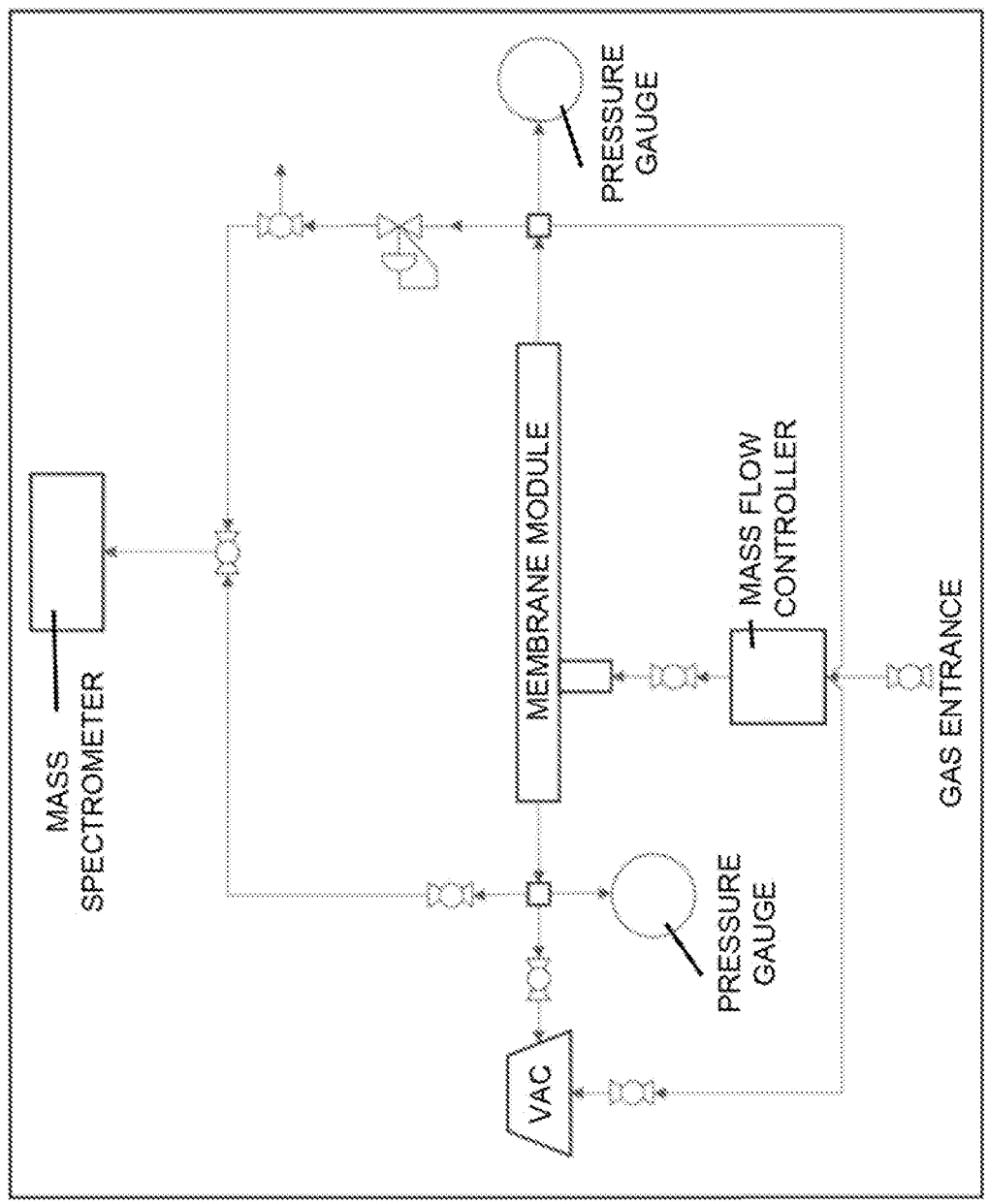
FIG. 5 shows a mixed gas permeability apparatus used to measure the mixed-gas selectivity of HFC-32 and HFC-125.

The mixed-gas selectivity of HFC-32 and HFC-125 in 50 mol % PBVE—50 mol % PDD and other PBVE-co-PDD polymers was measured by adhering a small piece of membrane onto a brass disk and mounting it into a mixed-gas permeability apparatus shown in FIG. 5. The sample was vacuumed at $10^{-4}$ torr for a minimum of 12 hours to remove any volatile impurities. The pressure on the upstream side of the apparatus was maintained at a constant pressure of approximately 10 bar of R-410A, which was flowed across the membrane surface in order to maintain a constant upstream composition HFC-32 and HFC-125. The resulting retentate was then analyzed by a mass spectrometer (Hiden Isochema Ltd., IGA 003, Warrington, United Kingdom) tuned for the analysis of HFC-32 and HFC-125. The analysis was carried out for 4 days of operation to confirm the stability of the selectivity. The mixed gas selectivity results are shown in Table 4. The measured mixed gas selectivity of the compositions tested are in excellent agreement with the calculated ideal selectivity of HFC-32/HFC-125 shown in Table 3.

TABLE 4

Mixed-gas selectivity in PBVE-PDD copolymers at 35° C.

| Polymer | α |
|---|---|
| 100% PBVE | 5 ± 0.3 |
| 50% PBVE-50% PDD | 26 ± 2 |
| 5% PBVE-95% PDD | 14 ± 0.8 |

Example 7

Solubility of HFC-32 and HFC-125 in PBVE-co-PDD

A gravimetric microbalance (Hiden Isochema Ltd., IGA 003, Warrington, United Kingdom) was used to measure gas absorption of HFC-32 and HFC-125 into the polymeric films. The gravimetric microbalance is capable of measuring changes in sample mass as a function of gas composition, temperature, or pressure and allows for the determination of kinetic parameters and sorption equilibrium.[6] The instrumental components and theory of the gravimetric microbalance have been described in detail in a previous reference; however, modifications to the procedure have been made.[7] A rectangular strip (4 cm×1 cm) of polymer film (300 mg) was placed on a small copper hook and hung on a tungsten hang-down wire. The sample was degassed under vacuum ($10^{-10}$ MPa) at the measurement temperature for approximately 24 hours to remove any residual water content or volatile impurities. In order to establish thermodynamic equilibrium, each pressure point was completed with a minimum time requirement of 12 hours. Stability of the balance as well as the kinetic sorption profile were measured by the HISorp software program. The microbalance can be operated in two different modes: static mode or dynamic mode. In static mode, gas is admitted away from the sample and the pressure is kept constant by the use of admit and exhaust valves. In dynamic mode, a continuous stream of gas flows past the sample, with the exhaust valve controlling the setpoint pressure.[6] For these experiments, the balance was operated in static mode. A jacketed water bath was used to control sample temperature, and the sample and counterweight temperatures were measured with an in-situ K-type thermocouple with an uncertainty of ±0.1 K. The thermocouple was calibrated with a platinum resistance thermometer (Hart Scientific SPRT model 5699 and readout Hart Scientific Blackstack model 1560 with a SPRT module 2560) with an accuracy of ±0.005 K. The resolution of the IGA microbalance is 0.0001 mg for absorption and desorption measurements at a given temperature and pressure. The gas sorption data were corrected for buoyancy and volume expansion as described previously.[6] Sorption isotherms of HFC-125 and HFC-32 in PBVE and PBVE-co-PDD films were measured.

From the sorption data of the permeating gases in the polymeric films, the solubility of each penetrant was calculated using the following equation:

$$S = \frac{C}{p} \quad (2)$$

where S is the solubility, C is the concentration, and p is the permeate pressure.

Using Eq. 3, the solubility of each penetrant in the respective films are plotted versus the pressure. The solubility coefficient, $S^\infty$, which is the solubility at infinite dilution, is defined as follows:

$$S^\infty = \lim_{p \to 0}\left(\frac{C}{p}\right) \approx \left(\frac{dC}{dp}\right)_{p=0} \quad (3)$$

where C is the equilibrium penetrant concentration at the pressure p.

Figure 6:
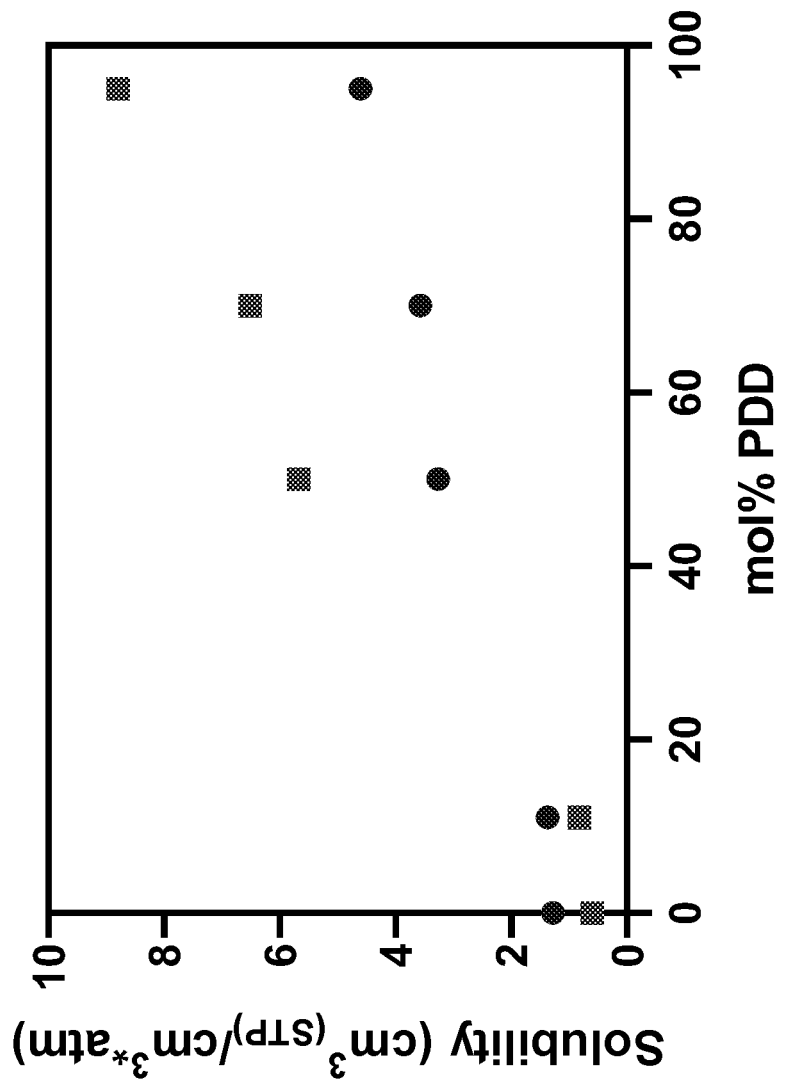
FIG. 6 shows the solubility of HFC-32 (○) and HFC-125 (□) in PBVE-co-PDD Polymers at 35° C. and 2 bar.

The solubility of HFC-32 and HFC-125 in PBVE-co-PDD polymers are shown as a function of PDD content in FIG. 6. Increasing amount of PDD lead to greater penetrant solubility. Tabulated solubility of HFC-32 and HFC-125 is shown in Table 5.

TABLE 5

Solubility of HFC-32 and HFC-125 in PBVE-co-PDD polymers at 35° C. and 2 bar

| Polymer | Gas | S (cm$^3_{(STP)}$/cm$^3$*atm) |
|---|---|---|
| PBVE | HFC-32 | 1.29 ± 0.01 |
|  | HFC-125 | 0.61 ± 0.01 |
| 89% PBVE-11% PDD | HFC-32 | 1.38 ± 0.01 |
|  | HFC-125 | 0.83 ± 0.01 |
| 50% PBVE-50% PDD | HFC-32 | 3.27 ± 0.02 |
|  | HFC-125 | 5.68 ± 0.09 |
| 30% PBVE-70% PDD | HFC-32 | 3.58 ± 0.04 |
|  | HFC-125 | 6.52 ± 0.04 |
| 5% PBVE-95% PDD | HFC-32 | 4.61 ± 0.06 |
|  | HFC-125 | 8.80 ± 0.05 |

Example 8

Diffusivity of HFC-32 and HFC-125 in PBVE-co-PDD Polymers

Since the permeability is a function of the solubility and the diffusivity, the time-dependent absorption data for HFC-32 and HFC-125 in the polymeric films was collected with the gravimetric microbalance at 308.15 K and 0.2 MPa. The diffusivity was modeled using Fick's Second Law of diffusion, as shown in Eq. 4:

$$\frac{dC}{dt} = D \frac{d^2 C}{dx^2} \quad (4)$$

In our analysis, the following assumptions were made to describe the system:

(1) The permeating species dissolves by a one-dimensional (horizontal) diffusion process (2) A thin boundary layer exists at the interface between the permeating species and the polymeric film, where the saturation concentration is instantly established (3) Interactions between the permeating species and the polymeric film are physical Given these assumptions, the following boundary and initial conditions are applied to describe the system:

$$IC: t = 0, 0 < x < \delta, \text{ and } C = C_o \quad (5)$$

$$BC1: t > 0, x = 0, \text{ and } C = C_s \quad (6)$$

$$BC2: t > 0, x = \frac{\delta}{2}, \text{ and } \frac{dC}{dx} = 0 \quad (7)$$

where C is the concentration of the permeating species in the polymeric material as a function of time, $C_s$ is the saturation concentration, $\delta$ is the film thickness, x is the horizontal location, and D is the constant diffusion coefficient. Solving this initial boundary value problem using separation of variables yields the following solution:

$$C = C_s - \frac{2}{\pi}(C_0 - C_s) \sum_{n=0}^{\infty} \left( \frac{(-1)^n - 1}{n} e^{-\frac{D\pi^2 n^2 t}{L^2}} \sin\left(\frac{\pi n x}{L}\right) \right) \quad (8)$$

where L is the thickness of the sample. In order to obtain the average concentration across the polymeric film, Eq. 8 can be integrated from 0 to L and divided by L. The average concentration is then represented by Eq. 9:

$$\langle C \rangle = C_s + \frac{2}{\pi^2}(C_0 - C_s) \sum_{n=0}^{\infty} \left( \frac{(-1)^n - 1}{n^2} e^{-\frac{D\pi^2 n^2 t}{L^2}} (\cos(n\pi) - 1) \right) \quad (9)$$

Although Eq. 9 contains an infinite summation term, the first 20 terms provides sufficient numerical precision. In order to predict the diffusion coefficient of a species into a polymeric material at a specific temperature and pressure, a non-linear regression is used to fit the diffusion model to experimental concentration. The best fit parameters of the regression are used to determine the equilibrium concentration ($C_S$) and the diffusion coefficient (D).

The diffusivity of HFC-32 and HF5-125 is shown as a function of PDD composition in Table 6. In general, diffusivity increases with increasing PDD content, but the diffusivity ratio of HFC-32 to HFC-125 ($D_{HFC-32}/D_{HFC-125}$) is maximized at the 50 mol % PBVE—50 mol % PDD composition, indicating a diffusivity-driven separation as shown by the maximum $D_{HFC-32}/D_{HFC-125}$=83.8±3.8 as shown in Table 6.

TABLE 6

Diffusion coefficients for HFC-32 and HFC-125 in PBVE-co-PDD polymers at 35° C. and 2 bar

| Polymer | Gas | D (10$^{-6}$ cm$^2$/s) | $D_{HFC-32}/D_{HFC-125}$ |
|---|---|---|---|
| PBVE | HFC-32 | 0.0039 ± 0.0002 | 7.5 ± 2.9 |
|  | HFC-125 | 0.00052 ± 0.0002 | — |
| 89% PBVE-11% PDD | HFC-32 | 0.0073 ± 0.0002 | 28.1 ± 2.3 |
|  | HFC-125 | 0.00026 ± 0.00002 | — |
| 50% PBVE-50% PDD | HFC-32 | 0.057 ± 0.002 | 83.8 ± 3.8 |
|  | HFC-125 | 0.00068 ± 0.00002 | — |
| 30% PBVE-70% PDD | HFC-32 | 0.12 ± 0.02 | 36.4 ± 12.6 |
|  | HFC-125 | 0.0033 ± 0.001 | — |
| 5% PBVE-95% PDD | HFC-32 | 0.65 ± 0.1 | 20.3 ± 7.1 |
|  | HFC-125 | 0.032 ± 0.01 | — |

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

REFERENCES (1) Kyoto Protocol—Targets for the first commitment period 1 UNFCCC https://unfccc.int/process-and-meetings/the-kyoto-protocol/what-is-the-kyoto-protocol/kyoto-protocol-targets-for-the-first-commitment-period (accessed 2021-01-11).

(2) Mota-Babiloni, A.; Navarro-Esbri, J.; Barragán-Cervera, Á.; Molés, F.; Penis, B. Analysis Based on EU Regulation No 517/2014 of New HFC/HFO Mixtures as Alternatives of High GWP Refrigerants in Refrigeration and HVAC Systems. *International Journal of Refrigeration*. 2015. https://doi.org/10.1016/j.ijrefrig.2014.12.021.

(3) Epa. Protecting Our Climate by Reducing Use of Hydrofluorocarbons Proposed Rule-Phasedown of Hydrofluorocarbons: Establishing the Allowance Allocation and Trading Program under the American Innovation and Manufacturing Act. 2021.

(4) Pardo, F.; Zarca, G.; Urtiaga, A. Effect of Feed Pressure and Long-Term Separation Performance of Pebax-Ionic Liquid Membranes for the Recovery of Difluoromethane (R32) from Refrigerant Mixture R410A. *Journal of Membrane Science* 2021, 618, 118744. https://doi.org/10.1016/j.memsci.2020.118744.

(5) IIF-IIR; V., M.; D., C.; L., D. J. *The Impact of the Refrigeration Sector on Climate Change, 35th Informatory Note on Refrigeration Technologies.*; IIF-IIR, 2017.

(6) Shiflett, M. B.; Yokozeki, A. Solubilities and Diffusivities of Carbon Dioxide in Ionic Liquids: [Bmim][PF6] and [Bmim][BF4]. *Industrial and Engineering Chemistry Research* 2005, 44 (12), 4453-4464. https://doi.org/10.1021/ie058003d.

(7) Minnick, D. L.; Turnaoglu, T.; Rocha, M. A.; Shiflett, M. B. Review Article: Gas and Vapor Sorption Measurements Using Electronic Beam Balances. *Journal of Vacuum Science & Technology A: Vacuum, Surfaces, and Films* 2018, 36 (5), 050801. https://doi.org/10.1116/1.5044552.

The invention claimed is:

1. A separation article comprising a first surface and a second surface, and a selective layer adjacent to at least one of the first surface or the second surface, wherein said selective layer comprises an amorphous fluorinated copolymer for selectively removing difluoromethane (HFC-32, $CH_2F_2$) from a gaseous mixture.

2. The separation article of claim 1, wherein the amorphous fluorinated copolymer is produced by copolymerizing two or more fluorinated non-dioxolane ring monomers.

3. The separation article of claim 2, wherein the fluorinated non-dioxolane ring monomer comprises two or more of the following compounds:

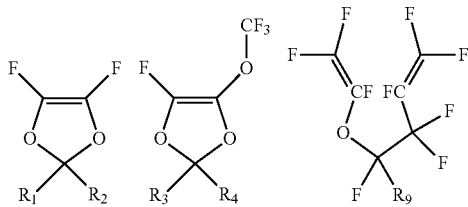

wherein
$R_1$ and $R_2$ are independently F, $CF_3$, $CF_2CF_3$, $CF_2H$, $CF_2CF_2H$, $CFHCF_3$, $CFHCF_2H$;
$R_3$ and $R_4$ are independently F, $CF_3$, or $CF_2CF_3$, $CF_2H$, $CF_2CF_2H$, $CFHCF_3$, $CFHCF_2H$; and
$R_9$ is F, $CF_3$, or $CF_2CF_3$.

4. The separation article of claim 1, wherein the amorphous fluorinated copolymer comprises a copolymer of perfluoro(butenyl vinyl ether) [PBVE] and perfluoro(2,2-dimethyl-1,3-dioxole) [PDD].

5. The separation article of claim 4, wherein the amorphous fluorinated copolymer has a PBVE content between about 20 mol % and about 90 mol % and a PDD content between about 20 mol % and about 90 mol %.

6. The separation article of claim 4, wherein the amorphous fluorinated copolymer has a PBVE content between about 40 mol % and about 60 mol % and a PDD content between about 40 mol % and about 60 mol %.

7. The separation article of claim 1, wherein the selective layer is the amorphous fluorinated copolymer consisting of perfluoro(butenyl vinyl ether) [PBVE] and perfluoro(2,2-dimethyl-1,3-dioxole) [PDD].

8. The separation article of claim 1, wherein the amorphous fluorinated copolymer has a glass transition temperature of from about 150° C. to about 260° C.

9. The separation article of claim 1, wherein the amorphous fluorinated copolymer has a number average molecular weight ($M_n$) of from about 10 kDa to about 2,000 kDa.

10. The separation article of claim 1, wherein the amorphous fluorinated copolymer has a weight average molecular weight ($M_w$) of from about 10,000 g/mol to about 3,000,000 g/mol.

11. The separation article of claim 1, wherein the gaseous mixture comprises difluoromethane (HFC-32) and pentafluoroethane (HFC-125).

12. The separation article of claim 1, wherein the amorphous fluorinated copolymer has an ideal selectivity of HFC-32 to HFC-125 from about 5 to about 50.

13. The separation article of claim 1, wherein the amorphous fluorinated copolymer has a diffusivity ratio of HFC-32 to HFC-125 of from about 10 to about 200.

14. The separation article of claim 1, wherein the article comprises a film, a membrane, a tube, or a fiber.

15. The separation article of claim 14, wherein the article comprises a coating of the amorphous fluorinated copolymer.

16. The separation article of claim 1, wherein the article comprises an asymmetric membrane comprising the amorphous fluorinated copolymer adjacent to a microporous support layer.

17. The separation article of claim 1, wherein the article comprises an asymmetric membrane comprising the amorphous fluorinated copolymer adjacent to a gutter layer, and the gutter layer is adjacent to a microporous support layer.

18. The separation article of claim 1, wherein the article comprises a membrane unit having a plurality of hollow fiber membranes, the membrane unit having a feed side and a permeate side, wherein the hollow fibers comprise the amorphous fluorinated copolymer.

19. A method for separating a first gaseous component from the gaseous mixture comprising two or more fluorinated gases, said process comprising passing the gaseous mixture across the separation article of claim 1, wherein the gaseous mixture comes into contact with the selective layer.

20. The method of claim 19, wherein the method comprises
(a) passing the gaseous mixture across the separation article having a feed side and a permeate side, the separation article having the selective layer that is selectively permeable to at least the first gaseous component, said selective layer comprising the amorphous fluorinated copolymer;
(b) providing a driving force sufficient to provide for permeation of at least a portion of the gaseous mixture from the feed side to the permeate side of the separation article, resulting in a gaseous permeate stream on the permeate side of the separation article and a gaseous retentate stream on the feed side of the separation article, wherein the gaseous permeate stream comprises the first gaseous component.

21. The method of claim 19, wherein the gaseous mixture comprises difluoromethane (HFC-32, $CH_2F_2$) and pentafluoroethane (HFC-125, $C_2F_5H$).

22. The method of claim 21, wherein the method selectively removes difluoromethane (HFC-32, $CH_2F_2$) from the gaseous mixture.

\* \* \* \* \*